(12) United States Patent
Potter

(10) Patent No.: US 11,512,828 B2
(45) Date of Patent: Nov. 29, 2022

(54) AUTOMOTIVE LAMP OPTICAL SYSTEM WITH LIGHT DIFFUSIVE PROJECTION LENS

(71) Applicant: VALEO VISION, Bobigny (FR)

(72) Inventor: Brant Potter, Seymour, IN (US)

(73) Assignee: Valeo Vision, Bobigny (FR)

( * ) Notice: Subject to any disclaimer, the term of this patent is extended or adjusted under 35 U.S.C. 154(b) by 43 days.

(21) Appl. No.: 17/108,418

(22) Filed: Dec. 1, 2020

(65) Prior Publication Data
US 2022/0170606 A1    Jun. 2, 2022

(51) Int. Cl.
| F21S 41/33 | (2018.01) |
| F21S 41/20 | (2018.01) |
| F21S 43/20 | (2018.01) |
| F21W 102/30 | (2018.01) |

(52) U.S. Cl.
CPC ........... *F21S 41/336* (2018.01); *F21S 41/285* (2018.01); *F21S 43/26* (2018.01); *F21W 2102/30* (2018.01)

(58) Field of Classification Search
USPC ........................................................ 362/518
See application file for complete search history.

(56) References Cited

U.S. PATENT DOCUMENTS

| 5,567,034 A | 10/1996 | Dietewich et al. |
| 8,177,408 B1 | 5/2012 | Coleman |
| 8,573,816 B2 | 11/2013 | Negley et al. |
| 10,400,981 B1 * | 9/2019 | Kingen ................... F21S 43/40 |
| 10,760,757 B2 * | 9/2020 | Tanoue ................. F21S 43/247 |
| 2002/0093829 A1 | 7/2002 | Pinson et al. |
| 2006/0263547 A1 | 11/2006 | Cojocariu et al. |
| 2011/0228549 A1 * | 9/2011 | Lindsay ................ F21S 43/237 362/555 |
| 2013/0215633 A1 * | 8/2013 | Wuerthele ............ B60Q 1/0047 362/543 |

(Continued)

FOREIGN PATENT DOCUMENTS

| FR | 2925656 A1 | 6/2009 |
| JP | 2012064535 A | 3/2012 |

(Continued)

OTHER PUBLICATIONS

European Patent Office, International Search Report and Written Opinion of corresponding International Application No. PCT/EP2021/083772, dated Mar. 15, 2022.

*Primary Examiner* — Christopher M Raabe
(74) *Attorney, Agent, or Firm* — Valeo Vision

(57) ABSTRACT

The present invention relates to an automotive optical system; the optical system includes one or more first optical elements that reflect light rays emitted from a number of first light sources that are configured to perform a first lighting function and a second optical element; the second optical element is configured to project a light beam from the first optical elements configured to perform the first lighting function where a portion of the second optical element is made of a diffusive material. Furthermore, the optical system includes a number of secondary light sources where the second optical element is configured to receive light ray emissions from the secondary light sources and perform a second lighting function by scattering light rays received from secondary light sources.

19 Claims, 13 Drawing Sheets

(56) References Cited

U.S. PATENT DOCUMENTS

| | | | |
|---|---|---|---|
| 2014/0211493 A1* | 7/2014 | Ichikawa | F21V 7/0025 |
| | | | 362/511 |
| 2015/0277027 A1* | 10/2015 | Koizumi | F21S 43/247 |
| | | | 362/511 |
| 2016/0146441 A1* | 5/2016 | Mochizuki | F21S 43/14 |
| | | | 315/77 |
| 2016/0356446 A1* | 12/2016 | Okada | F21S 43/241 |
| 2016/0369967 A1* | 12/2016 | Nakada | F21S 43/247 |
| 2017/0067615 A1* | 3/2017 | Okura | F21S 41/335 |
| 2019/0024868 A1 | 1/2019 | Baker et al. | |
| 2021/0332964 A1 | 10/2021 | Giraud | |

FOREIGN PATENT DOCUMENTS

| | | |
|---|---|---|
| JP | 2014060102 A | 4/2014 |
| WO | 2020025171 A1 | 2/2020 |

\* cited by examiner

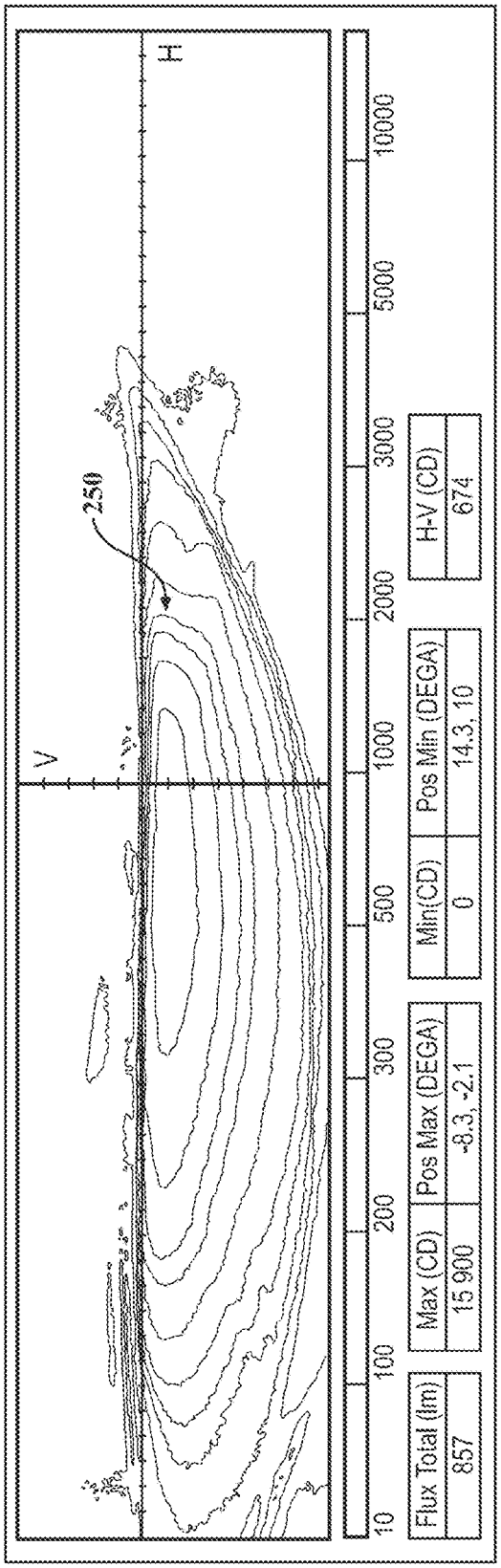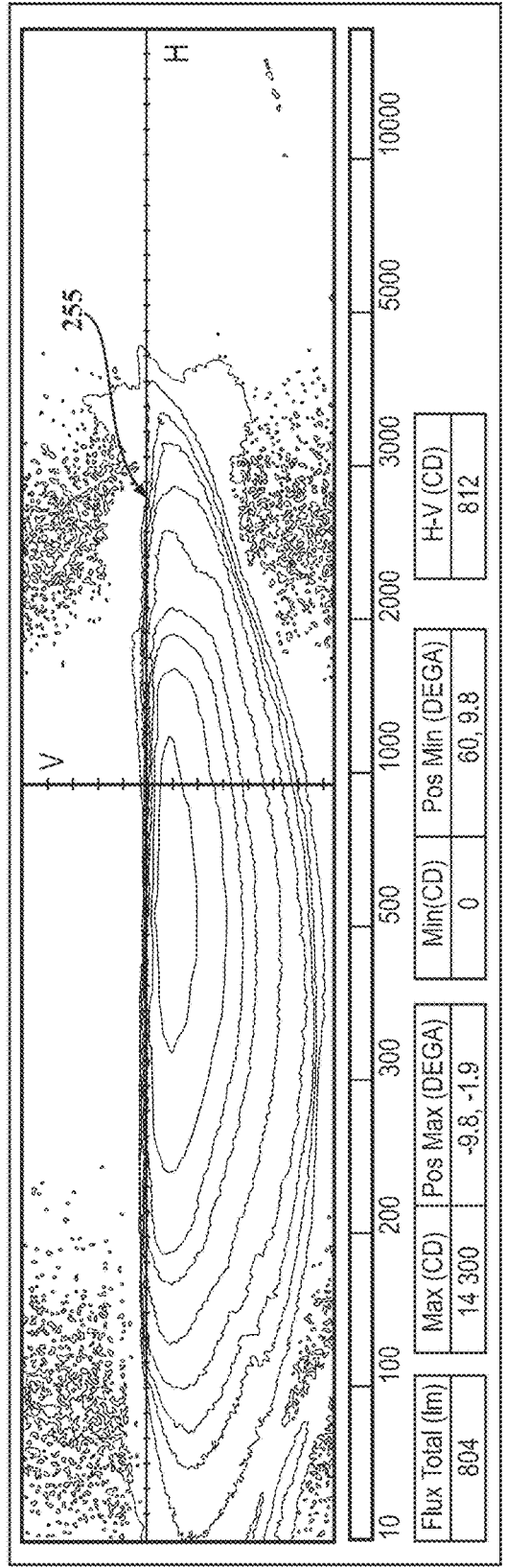

AUTOMOTIVE LAMP OPTICAL SYSTEM WITH LIGHT DIFFUSIVE PROJECTION LENS

FIELD OF THE INVENTION

The present invention relates to the motor vehicle lighting field. More specifically, the invention relates to optical systems applied to vehicle lamps.

BACKGROUND

Efforts to improve the lighting efficiency and uniformity, particularly for park, turn, signal, running and signature lamps, which are frequently integrated around headlamps and tail lamps, are an on-going endeavor among Original Equipment Manufacturers (OEM) and the numerous component/system suppliers. Of particular interest is the desire to propagate the light as uniformly as possible. The present invention is directed one such innovation solution to provide a lighting and/or signaling device which can perform multiple lighting functions with using a single projection lens and without using complex optics on the lens, while achieving uniform lit aspect.

In general, vehicle lamps include one or more optical modules to perform different lighting and/or signalling functions such as low beam function, high beam function, fog function etc. Each module comprises a reflector, a source of light which emits rays of light, and a projection lens. The reflector includes a reflective inner surface in order to reflect towards the projection lens at least part of the rays of light which are emitted by the source of light. The projection lens may be made of glass or of polymer material, for example chosen from the family of polycarbonates or PMMA (polymethyl methacrylate).

Conventional vehicle lamps further include a folder or a shield to create or form a cut-off in the lighting beam so that glaring on opposite coming vehicles can be prevented. In order to have a sharper cut-off and to perform a sign light function, and to perform other secondary functions, complex optical elements may be required to be added onto the projection lens.

Further, the outer lens or the projection lens of the conventional vehicle lamps may have thickness of about 25 mm. Hence, diffusive materials or opalescent materials cannot be added to the existing projection lens as it results in degrading the performance of lighting functions. Further, as the projection lens is thick lens, it increases its weight and complicates the production thereof. The invention herein overcomes one or more of the problems of the known vehicle lamps.

SUMMARY OF THE INVENTION

The present invention is directed to a unique solution to one or more of the problems discussed above. It is believed that that the present invention provides an optical system that is used to provide primary lighting functions (low beam function, high beam function, fog function etc.) and secondary lighting functions (signature lighting function, park function, etc.) by using a single diffusive projection lens and a shaping reflector, and by without using complex optical elements on the projection lens. Further, the optical system may be adapted to add sign light to the beam pattern, and further sharpens the gradient at the cut-off of the beam pattern, without negative impact on the performance of the primary lighting functions, i.e., low beam function, high beam function, and fog function. Thus, with the optical system of the present invention, simultaneous lighting functions can be performed by using a single projection lens.

Accordingly, pursuant to a first aspect of the present invention, there is contemplated an optical system for an automotive vehicle, the optical system comprises: one or more first optical elements that reflect light rays emitted from a number of first light sources that are configured to perform a first lighting function; a second optical element that is configured to project a light beam transmitted from the one or more first optical elements that are configured to perform the first lighting function, wherein at least a portion of the second optical element is made of a diffusive material; and a number of secondary light sources, wherein the second optical element is configured to receive light rays emitted from the number of secondary light sources and perform a second lighting function by scattering the light rays received from the number of secondary light sources.

The invention may be further characterized by one or any combination of the features described herein, such as the number of secondary light sources are arranged on at least one of: a number of sides of the second optical element, and a top of the second optical module; the one or more first optical elements are shaping reflectors; the one or more first light sources are arranged at the vicinity of the focus of the one or more first optical elements; the second optical element is a diffusive lens; the second optical element is arranged at a downstream location of the one or more first optical elements in a direction of propagation of associated light rays; the diffusive lens has a thickness of about 2 mm to 7 mm; the number of secondary light sources are arranged on a top of a flange of the diffusive lens; the number of first light sources and the number of secondary light sources are arranged on a same Printed Circuit Board (PCB); the number of first light sources and the number of secondary light sources are arranged on different PCBs; the first lighting function is one of: a low beam function, a high beam function, and fog function; the second lighting function is one of: signature function, park function; the diffusive material includes at least one of Poly(methyl methacrylate) types: Evonik Acrylite, PMMA 8N LD12, PMMA 8N LD24, and PMMA 8N LD 48, and the like; the second optical element is adapted to produce the light beam pattern with a sharper cut off; top and bottom portions of the second optical element is made of a non-diffusive material and a middle portion of the second optical element is made of the diffusive material; the complete portion of the second optical element is made of the diffusive material; the second optical element is produced by a multi-shot injection process; the second optical element is adapted to increase the sharpness of the cut-off of the light beam pattern with the increased diffusivity of the diffusive material, which is applied to produce the second optical element; and the second optical element is an outer lens of the optical system.

Accordingly, pursuant to a second aspect of the present invention, there is contemplated a headlamp assembly for an automotive vehicle, the headlamp assembly comprises: a number of low beam modules configured to generate a low beam distribution; a number of high beam modules configured to generate a high beam distribution; and wherein at least one of the low beam modules and the high beam modules includes an optical system comprising: one or more first optical elements that are configured to reflect light rays emitted from a number of first light sources configured to perform a first lighting function; a second optical element arranged at a downstream location of the one or more first optical elements that is configured to project a light beam that is transmitted from the one or more first optical elements configured to perform the first lighting function, wherein at least a portion of the second optical element is made of a diffusive material; and a number of secondary light sources, wherein the second optical element is configured to receive light rays emitted from the number of secondary light sources and perform a second lighting function by scattering the light rays received from the number of secondary light sources.

It should be appreciated that the above referenced aspects and examples are non-limiting, as others exist within the present invention, as shown and described herein.

DESCRIPTION OF DRAWINGS

A more complete appreciation of the invention and many of the attendant advantages thereof will be readily obtained as the same becomes better understood by reference to the detailed description herein when considered in connection with the accompanying drawings, wherein:

FIG. 10a shows exemplary luminous intensity distribution of a flat low beam module of the vehicle lamp having multi-shot projection lens with no diffusive material, according to an exemplary embodiment of the present invention.

FIG. 10b shows exemplary luminous intensity distribution of a flat low beam module of the vehicle lamp having multi-shot diffusive projection lens, according to an exemplary embodiment of the present invention.

DETAILED DESCRIPTION OF THE PREFERRED EMBODIMENTS

The present invention relates to an optical system of an automotive vehicle, in particular, of a vehicle lamp. The optical system may be configured to provide primary lighting functions (low beam function, high beam function, fog function etc.) and secondary lighting functions (signature lighting function, park function, etc.) by using a single diffusive projection lens and a shaping reflector, and by without using complex optical elements on the projection lens. Further, the optical system may be adapted to add sign light to the beam pattern, and further sharpens the gradient at the cut-off of the beam pattern, without negative impact on the performance of the primary lighting functions, i.e., low beam function, high beam function, and fog function. Thus, with the optical system of the present invention, simultaneous lighting functions can be performed by using a single projection lens.

Figure 1:
FIG. 1 shows an optical system of a vehicle lamp assembly according to an embodiment of the present invention.

FIG. 1 shows an optical system of a vehicle lamp assembly according to an embodiment of the present invention. The optical system 100 comprises one or more first optical elements 110 that reflect light rays emitted from a number of first light sources 140a (not shown in the FIG. 1 but shown in the FIG. 2) that are configured to perform a first lighting function. Optical system 100 discussed herein may be a part of a low beam module or high beam module or matrix beam module or a fog beam module. For example, the first or primary lighting functions include one of: a low beam function, a high beam function, and a fog function. For example, a low beam module of the vehicle lamp assembly performs the low beam function and a high beam module of the vehicle lamp assembly performs the high beam function.

In an embodiment, the one or more first optical elements 110 are shaping reflectors or shaping collectors, which will be explained in detail with regard to FIG. 2. The optical system 100 further comprises a second optical element 120 configured to project a light beam transmitted from the one or more first optical elements 110. In an aspect, the second optical element 120 is a projection lens or an outer lens of the vehicle lamp assembly. In an embodiment, at least a portion of the second optical element 120 is made of a diffusive material. In another embodiment, complete portion of the second optical element 120 is made of diffusive material. The second optical element may be referred as a diffusive projection lens as it is made of the diffusive material. Furthermore, FIG. 1's shown optical system 100 includes a housing 130 to encapsulate different components of the vehicle lamp assembly.

Figure 3A:
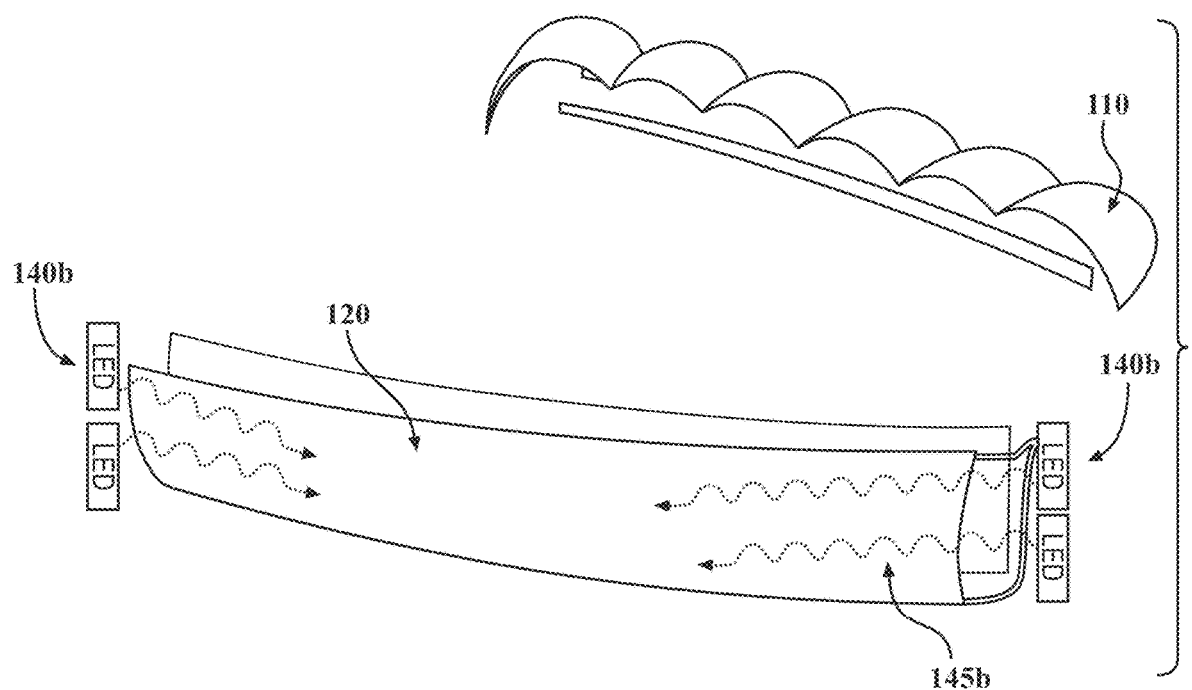
FIG. 3a shows arrangement of a shaping reflector, a diffusive projection lens and a secondary light source of the optical system, according to an embodiment of the present invention
Figure 3B:
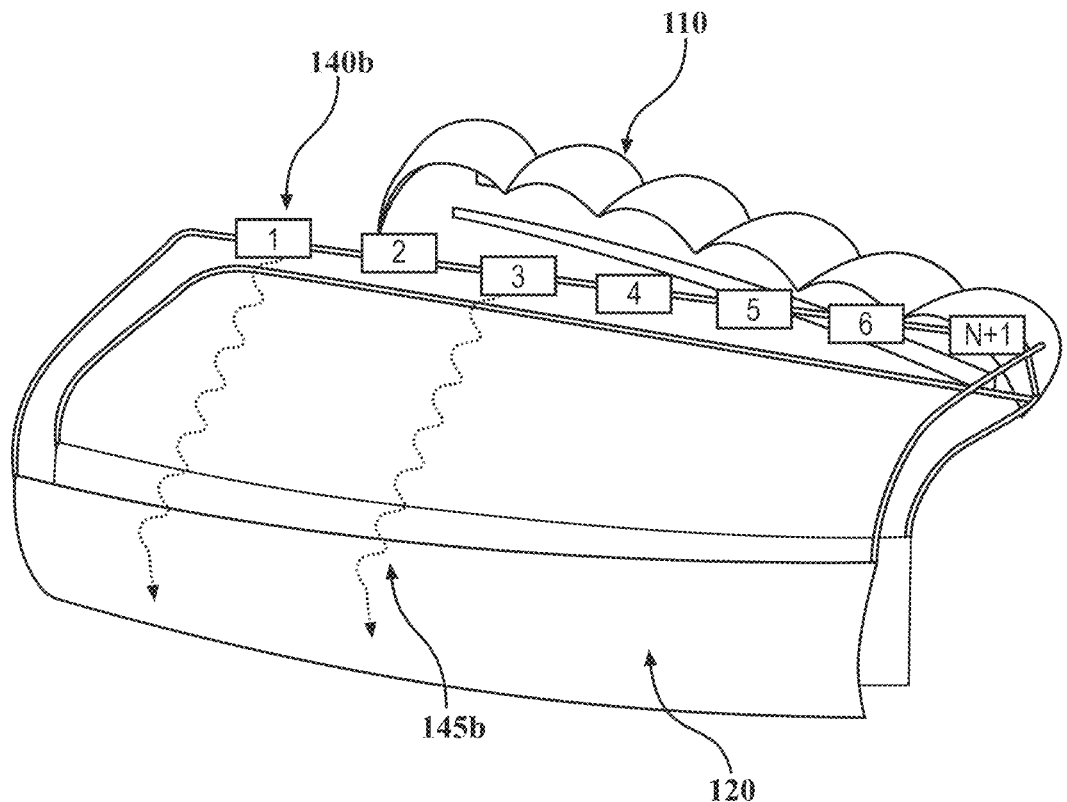
FIG. 3b shows arrangement of a shaping reflector, a diffusive projection lens and a secondary light source of the optical system, according to another embodiment of the present invention.

In addition, the optical system 100 further comprises a number of secondary light sources 140b (shown in FIG. 3a and the FIG. 3b). The second optical element or the diffusive projection lens 120 may be configured to receive light rays emitted from the number of secondary light sources and perform a secondary lighting function by scattering the light rays received from the number of secondary light sources 140b. For example, the secondary lighting function is one of: signature function, park function. In particular, the diffusive projection lens 120 of the optical system 100 may be adapted to provide the secondary lighting functions and also adds or improves sign light, and further smoothens the gradient, without degrading the performance of the primary lighting functions. In addition, the diffusive projection lens 120 aids in improving beam pattern uniformity.

It is contemplated that relationship between the components and component assemblies are surprisingly important in solving one or more issues described in the background section above. Each of the components and component assemblies and the associated relationships are disclosed in greater detail and specifically in the following paragraphs.

Shaping Reflector 110

The major functional aim of the reflector is to capture the greatest possible share of the luminous flux radiated by the light source and to direct this towards the road. There are various different reflector systems available to enable headlamp designers to meet this requirement as effectively as possible.

Figure 2:
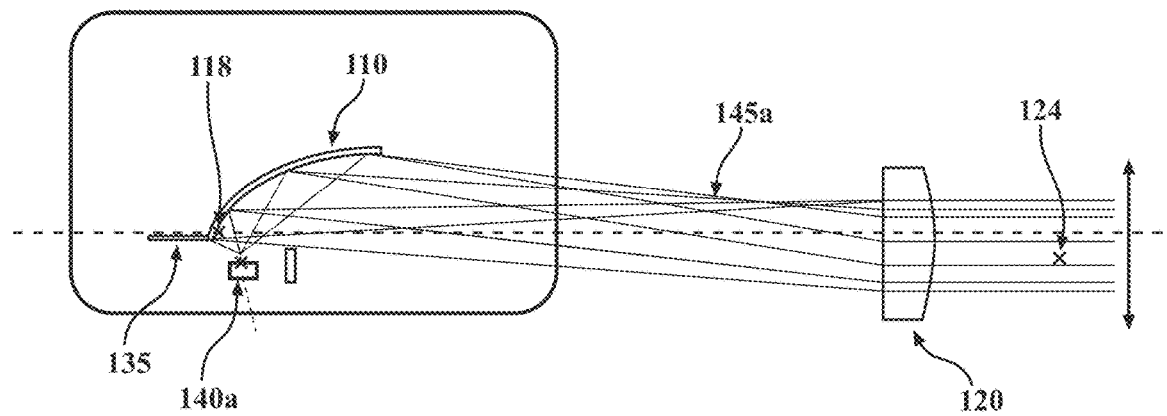
FIG. 2 is a schematic arrangement of different components of the optical system in which a reflector is a shaping reflector and a lens is a diffusive projection lens, according to an embodiment of the present invention.

Shaping reflector 110 is a type of reflector which includes a cut-off profile 135 as a part of the reflector at the bottom of the reflector as shown in the FIG. 2. In particular, cut off is produced by a rear edge of the reflective surface of the shaping collector. Thus, the shield or folder in not required to create the cut-off in the light beam pattern. In general, the shaping collector may include elliptical or parabolic reflective surfaces.

In the FIG. 2, the shaping reflector 110 shown is an elliptical reflector with a cut-off profile 135. The cut-off profile 135 of the shaping reflector 110 helps in creating a cut-off in the light beam. The elliptical reflector is shown in the FIG. 2 is for the purpose of explanation. However, the reflector can be any type of known reflectors without any limitation. The reflecting collector 110 further includes a first focal point 118 near to the rear edge of the reflecting surface. The reflective surface of the shaping reflector 110 is configured to collect the light rays emitted by a first light source 140a and reflects towards a projection lens 120, as shown in the FIG. 2. Further, the optical system 100 having the shaping reflector 110 is configured to form a luminous image of the reflective surface.

Projection Lens 120

Projections lens 120 are intended to project a light beam on the road. In the present invention, the second optical element is a projection lens 120, which projects the light rays reflected by the shaping reflector 110. Further, the projection lens 120 also referred as outer lens and the thickness of the projection lens of the conventional vehicle lamps may be about 25 mm. Hence, diffusive materials or opalescent materials cannot be added to the existing projection lens as it results in degrading the performance of lighting functions.

The lens 120 of the present invention is said to be thin, for example with a thickness, along the optical axis of the device that is smaller than 7 mm, in particular because of the small lens height and the long focal length thereof. As the lens has a thickness of about 2 mm to 7 mm, it allows the use of diffusive materials. The lens 120 has a second focal point 124 as shown in the FIG. 1.

Diffusive Materials

Diffusive material may represent different grades of light-scattering bodies. Diffusive or opalescent materials include materials that promote or aid in scattering light rays emitted from a light source. Without limitation, examples of diffusive or opalescent materials include various grades of silicone, polycarbonate or Poly-methyl methacrylate (PMMA), highly transmissive plastics, such as PS (polystyrene), PMMA are (poly-Methyl methacrylate), COC (cyclic olefine copolymer), PET (polyethylene terephthalate), glass, resin, Evonik Endlighten, or similarly applied materials and applications of various grades of other opalescent material, by examples. Furthermore, different grades of diffusive materials can be used to form the projection lens. For additional examples, different grades of diffusive materials include. at least one of Poly methyl methacrylate types: Evonik Acrylite, PMMA 8N LD12, PMMA 8N LD24, and PMMA 8N LD 48, and the like. The projection lens, which is made of diffusive material, is referred as a diffusive projection lens. The diffusive projection lens aids in increasing the sharpness of the cut-off of the light beam pattern with the increased diffusivity of the diffusive material.

Light Source (140a, 140b)

Light source represents a visually perceived source of electromagnetic radiation or an energized source of visually perceived radiant energy (inclusive of "Visible" light within the electromagnetic spectrum) but may include a broad combination or range of electromagnetic or radiant energy inclusive from among X-rays, ultraviolet and infrared energy, micro-wave and radio-wave spectrums. The light source may include every conventional and suitable lighting element sources such as filament-based or incandescent lamps, fluorescent lamps, arc or gas-discharge type lights, light emitting diodes (LED), or other suitable conventional sources.

Gradient

Gradient is a function of intensity and is defined as a log of intensity at point A of the intensity region of the light beam pattern minus the log of intensity at the adjacent point B of the intensity region of the light beam pattern. Gradient is highest at the cut-off of the beam pattern. Generally, gradient is in the range between 0.2 to 0.25.

Kink or Elbow

A beam pattern having a cut-off profile known by the term "kink" or "elbow. As is known to one skilled in the art, the cut-off is a defined line of cut-off below which light from the headlamp assembly is projected. In general, the light output is below the cut-off which is below the eyes of a driver in an oncoming vehicle.

Low Beam Function

The low beam module of a vehicle lamp assembly performs a low beam function to generate a low beam. Low beam provides alight distribution to give adequate forward and lateral illumination without dazzling the oncoming vehicles. Low beam may also be called passing beam or dipped beam.

High Beam Function

The high beam module of a vehicle lamp assembly performs a high beam function to generate a high beam. The high beam is a centre-weighted distribution of light with no control of glare. High beam may also be referenced as main beam or full beam.

Fog Beam Function

The fog beam module of the vehicle lamp assembly performs a fog beam function to generate a fog beam, which is a wide, bar-shaped beam of light with a sharper cut-off.

Parking Light Function

Parking light function is activated to indicate to other drivers of a driver's intention to park a vehicle in an empty parking spot. The parking light function is generally performed by a parking light, which is generally disposed at a rear portion of a vehicle.

Signature Lighting Function

Signature lights are automotive vehicle lamps having a specific shape, design and appearance to help distinguish or identify the vehicle. Signature lights are adapted to perform the signature lighting function.

Sign Light

The spread of the light above the cut-off of the beam pattern is referred as sign light. Sign light is used to illuminate highway signs, stop signs and the like. In conventional optical systems, special optics may be needed to obtain the sign light. According to the present invention, the diffusive material aids in adding sign light to the beam pattern.

Diffusivity

Diffusivity of the material is defined as a ratio of conductivity to density of the diffusive material. Number of scattering bodies in the diffusive material increases with increased diffusivity.

FIG. 2 is a schematic arrangement of different components of the optical system 100 in which a reflector is a shaping reflector 110 and lens is a diffusive projection lens 120 according to an embodiment of the present invention. As previously discussed, the shaping reflector 110 in combination with the diffusive projection lens 120 aids in improving the uniformity of beam pattern of the primary lighting functions such as low beam, high beam, and fog beam. Further, the diffusive projection lens aids in performing the secondary lighting functions, without negative impact on the primary lighting functions. As can be seen from the FIG. 2, the light beam emitted from the first light source 140a is reflected by the reflecting surface of the shaping reflector 110 and from there the reflected light is directed towards the diffusive projection lens 120 to perform the primary lighting function. The first light sources 140a and the secondary light source 140b includes a number of Light emitting diodes (LEDs). In an embodiment, the first light sources 140a are arranged at the vicinity of the focus of the shaping reflector 110, as shown in the FIG. 2. For the sake of brevity, one shaping reflector 110 is shown in the FIG. 2. However, first optical element 110 may include a plurality of shaping reflectors arranged in a transverse series as shown in the FIG. 3a and the FIG. 3b. The light emitted from the first light source 140a is reflected by the shaping reflectors 110 and propagated through the thin cross section of the diffusive projection lens 120 to perform the first lighting function.

In an embodiment of the present invention, the secondary light sources 140b may be positioned at the sides of the diffusive projection lens 120 as shown in the FIG. 3a. In this arrangement, the light emitted from the secondary light sources 140b is propagated through a longer path and thereby increases the scattering of the light. For instance, the diffusive projection lens 120 may be modified at the sides to arrange the secondary light sources 140b at the sides to pipe light through the diffusive projection lens 120, then the light would be scattered by the diffusive material to be used as signature or park function.

Figure 3C:
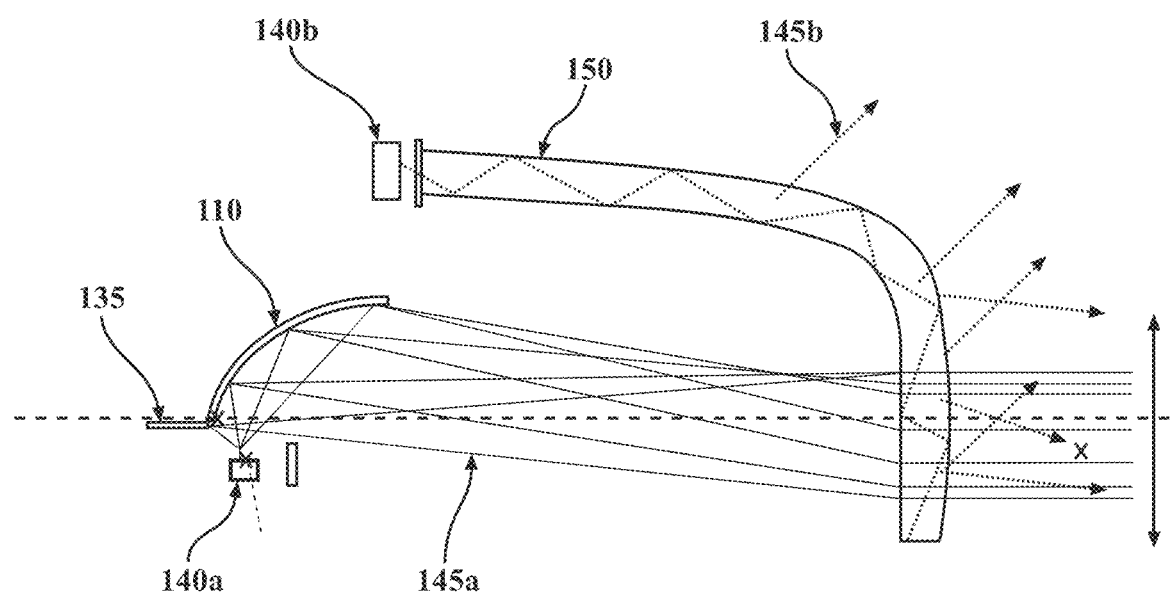
FIG. 3c shows a path of light rays, in particular, the light rays emitted from a secondary light source when the second light source is arranged as per the FIG. 3b.

In another embodiment of the present invention, the secondary light sources 140b may be positioned on a top of the diffusive projection lens 120 as shown in the FIG. 3b. For example, the secondary light sources 140b may be positioned on a top of a flange of the diffusive projection lens. With this arrangement, the light emitted from the secondary light sources 140b is guided towards the diffusive projection lens 120 through the one or more light guides 150 (shown in FIG. 3c), and then then the light would be scattered by the diffusive material to be used as signature or park function.

Yet, in another embodiment, some of the secondary light sources 140d may be positioned at the sides of the diffusive projection lens 120 and remaining secondary light sources 140d may be positioned on the top of the module.

FIG. 4a to FIG. 4d shows exemplary luminous intensity distributions of a low beam module (flat) of the vehicle lamp in which a projection lens is made of different grades of diffusive materials, according to an exemplary embodiment of the present invention. Although, the low beam module with diffusive projection lens was used to perform photometric simulations, it is understood to a person skilled in the art that a high beam module or a fog beam module with diffusive projection lens may be used to perform the photometric simulation. The projection lens was made with different grades of diffusive materials having different diffusivities to perform the photometric simulations. For example, different grades of diffusive material include PMMA 8N LD12, PMMA 8N LD24, and PMMA 8N LD 48, and PMMA 8N LD96. For the sake of brevity, the above mentioned grades of diffusive materials were used for producing the projection lens. However, it is understood to a person skilled in the art that any type of diffusive material may be used to obtain the diffusive projection lens.

For instance, the diffusive material PMMA 8N LD96 has less diffusivity compared to the diffusivity of PMMA 8N LD 48, which further has less diffusivity compared to diffusivity of PMMA 8N LD24. Further, PMMA 8N LD24 has less diffusivity compared to diffusivity PMMA 8N LD12.

In the FIG. 4a to FIG. 4d, the horizontal axis H and vertical axis V identify horizontal and vertical planes intersecting both the center of the headlamp and the screen.

Figure 4A:
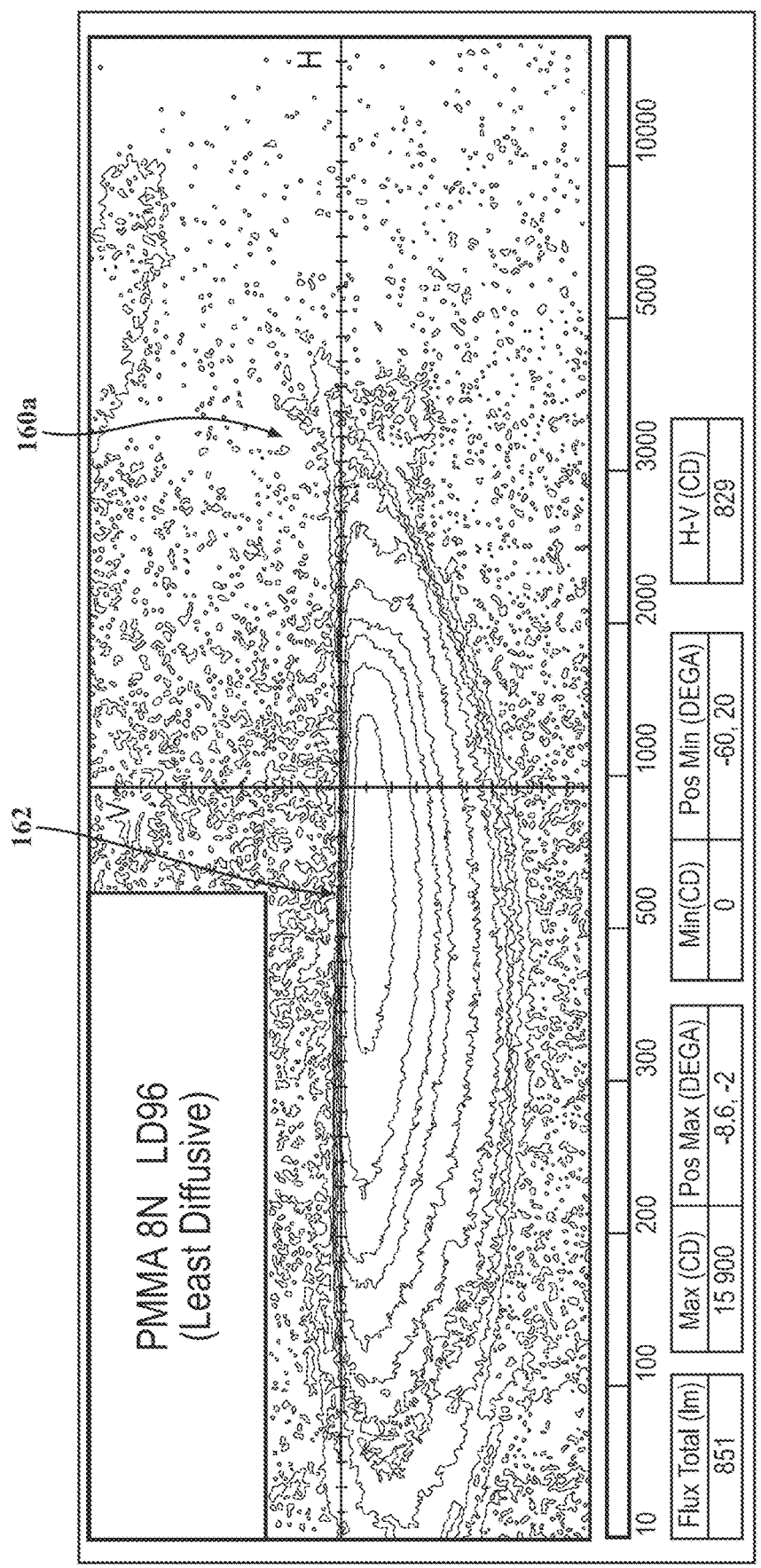
FIGS. 4a, 4b, 4c and 4d show exemplary luminous intensity distribution results of a low beam module (flat) of the vehicle lamp assembly in which a same projection lens applies different grades of diffusive materials, from minimum to maximum amounts of diffusive material, according to an exemplary embodiment of the present invention.

FIG. 4a shows luminous intensity distribution of the low beam module when the projection lens is made from PMMA 8N LD96 (least diffusive material). In the FIG. 4a, reference numeral 160a refers to the luminous intensity distribution. The maximum intensity is located at a position of −8.6 degrees along the horizontal axis and −2 degrees along the vertical axis. The maximum intensity illustrated is 15900 cd having a total lumen flux of 853.

Figure 4B:
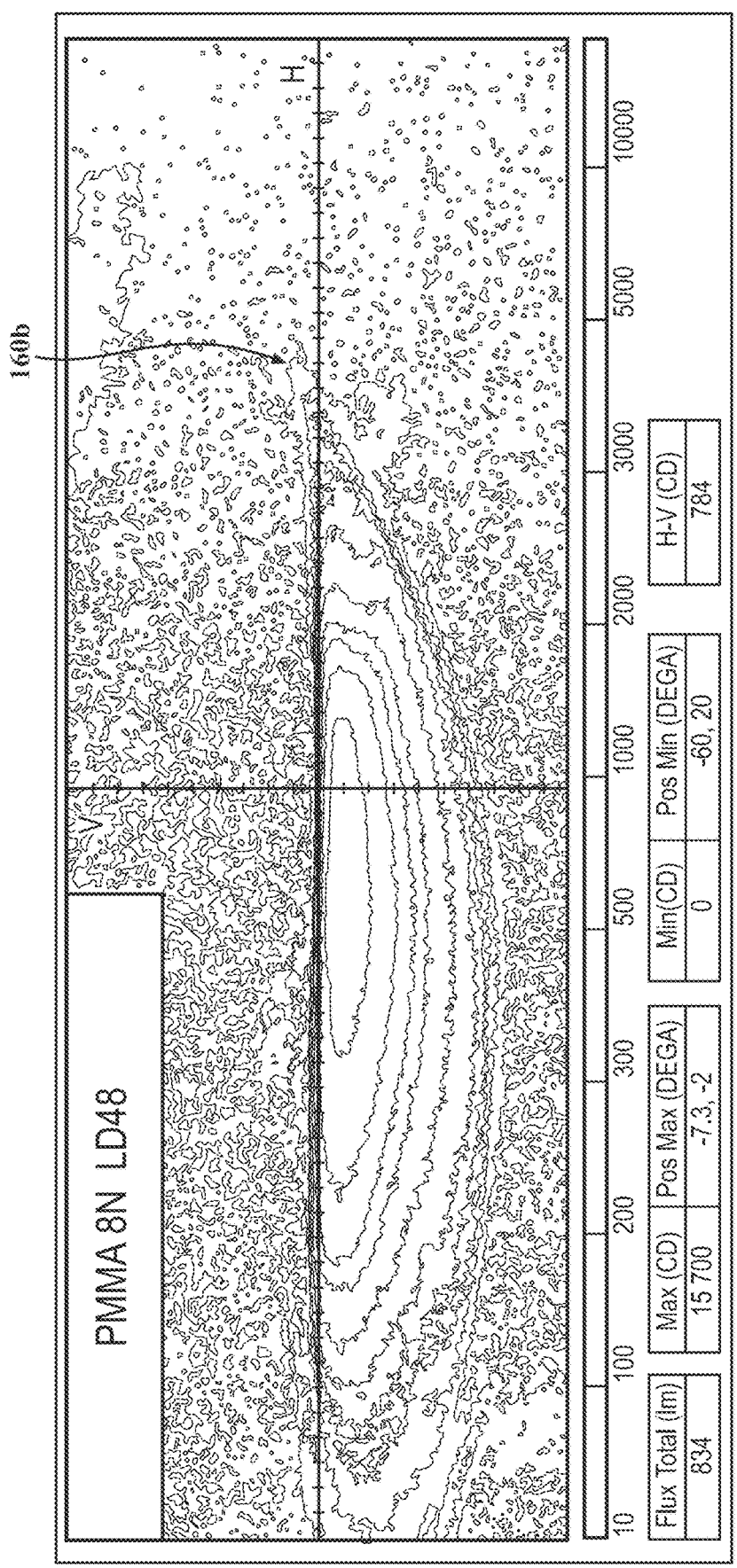

FIG. 4b shows luminous intensity distribution when the projection lens is made from PMMA 8N LD48. In the FIG. 4b, reference numeral 160b refers to the luminous intensity distribution. The maximum intensity is located at a position of −7.3 degrees along the horizontal axis and −2 degrees along the vertical axis. The maximum intensity illustrated is 15700 cd having a total lumen flux of 834.

Figure 4C:
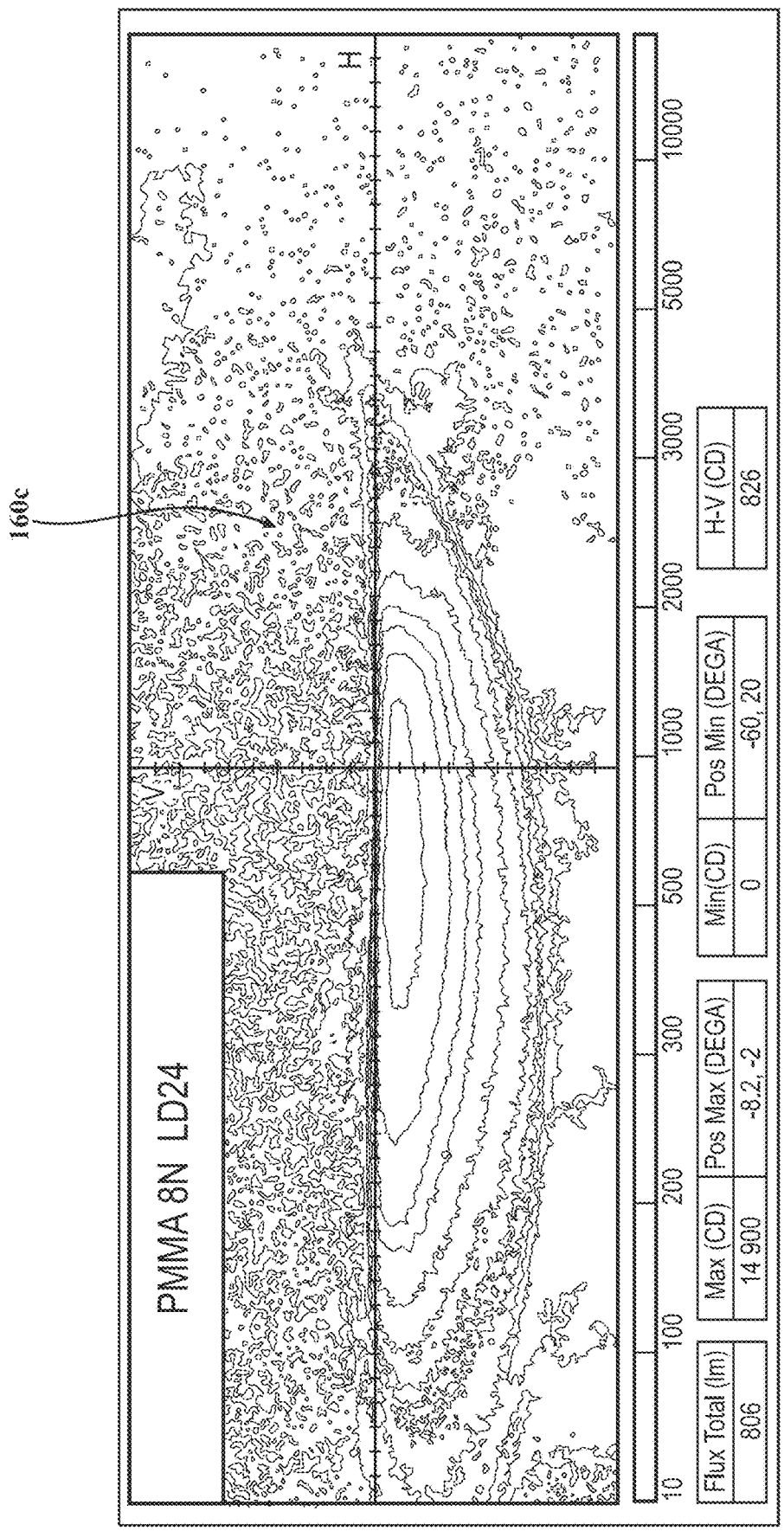

FIG. 4c shows luminous intensity distribution when the projection lens is made from PMMA 8N LD24. In the FIG. 4c, reference numeral 160c refers to the luminous intensity distribution. The maximum intensity is located at a position of −8.2 degrees along the horizontal axis and −2 degrees along the vertical axis. The maximum intensity illustrated is 14900 cd having a total lumen flux of 806.

Figure 4D:
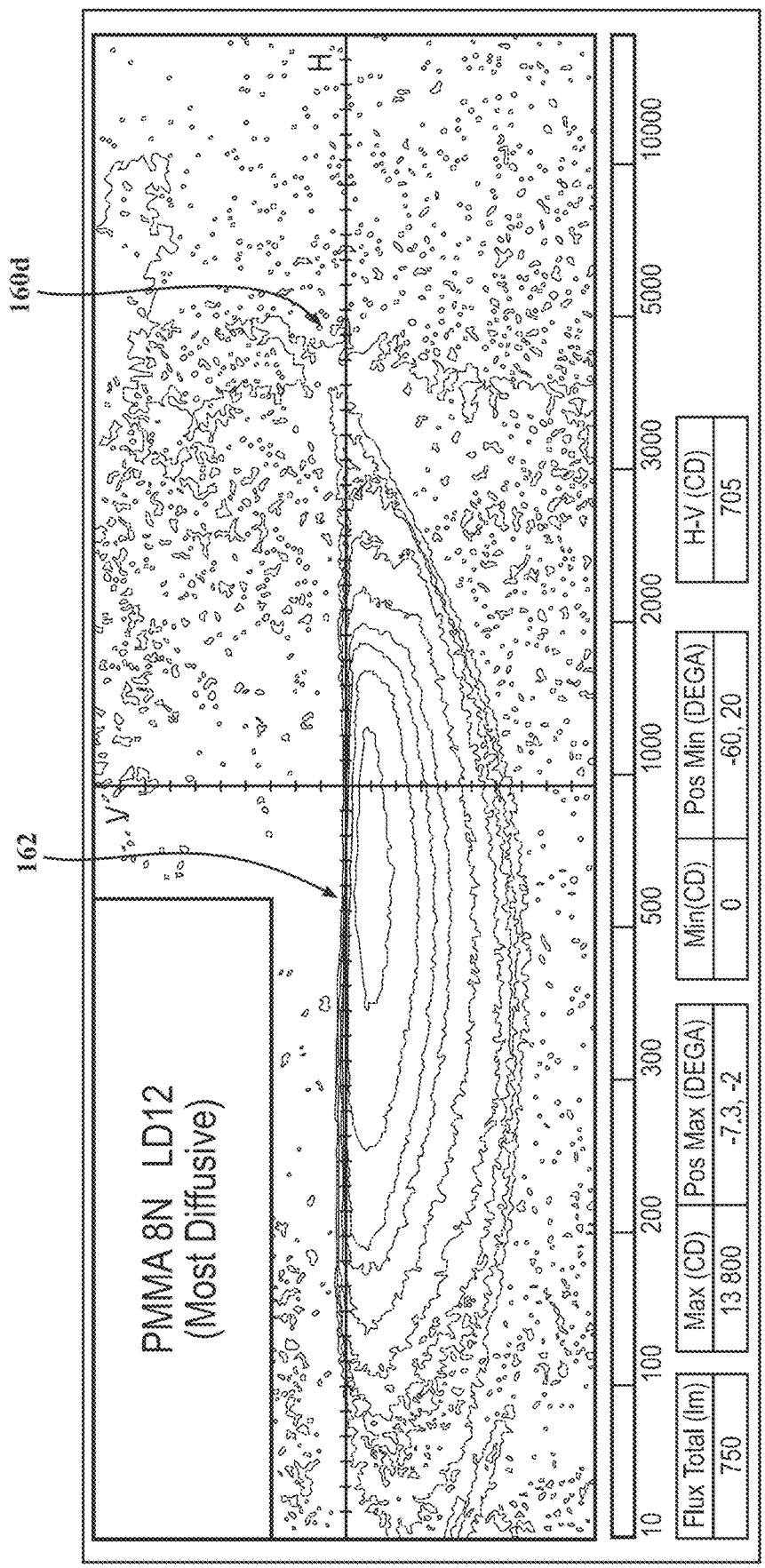

Further, FIG. 4d shows luminous intensity distribution when the projection lens is made from PMMA 8N LD12. In the FIG. 4d, reference numeral 160d refers to the luminous intensity distribution. The maximum intensity is located at a position of −7.3 degrees along the horizontal axis and −2 degrees along the vertical axis. The maximum intensity illustrated is 13800 cd having a total lumen flux of 750.

It may be seen in FIG. 4a to FIG. 4d that the luminous intensity distribution or the light beam patterns 160a 160b, 160c, 160d contains an upper flat cut-off 162 essentially level with the horizontal axis H. The cut-off is not perfectly straight; it has a curvature that corresponds to aberrations in the image thus produced. As can be seen from the FIG. 4a to FIG. 4d, the cut-off is sharpened with the increase of diffusivity.

Further, as can been from the FIG. 4a to FIG. 4d, with the increase in the diffusivity of the diffusive material, the scattering of the light has increased. For instance, the scattering of the light is more in FIG. 4b compared to the scattering of the light in the FIG. 4a. Further, the scattering of the light is more in FIG. 4c compared to the scattering of the light in the FIG. 4b, and the scattering of the light is more in FIG. 4d compared to the scattering of the light in the FIG. 4c. Further, it can be observed from the FIG. 4a to FIG. 4b that total output flux of the low beam module (flat) has decreased with increased diffusivity of the projection lens. Hence, the selection of grade of diffusive material is important such that scattering of the light can be increased for performing the second lighting function, without degrading the beam pattern but adds the sign light and softens the gradient at the cut-off of the beam pattern. Further, the photometric simulation results show that the use of diffusive material for projection lens is feasible.

In another exemplary embodiment of the present invention, the photometric simulations were performed to understand the performance of a flat low beam module with a conventional projection lens and with a diffusive projection lens.

Figure 5A:
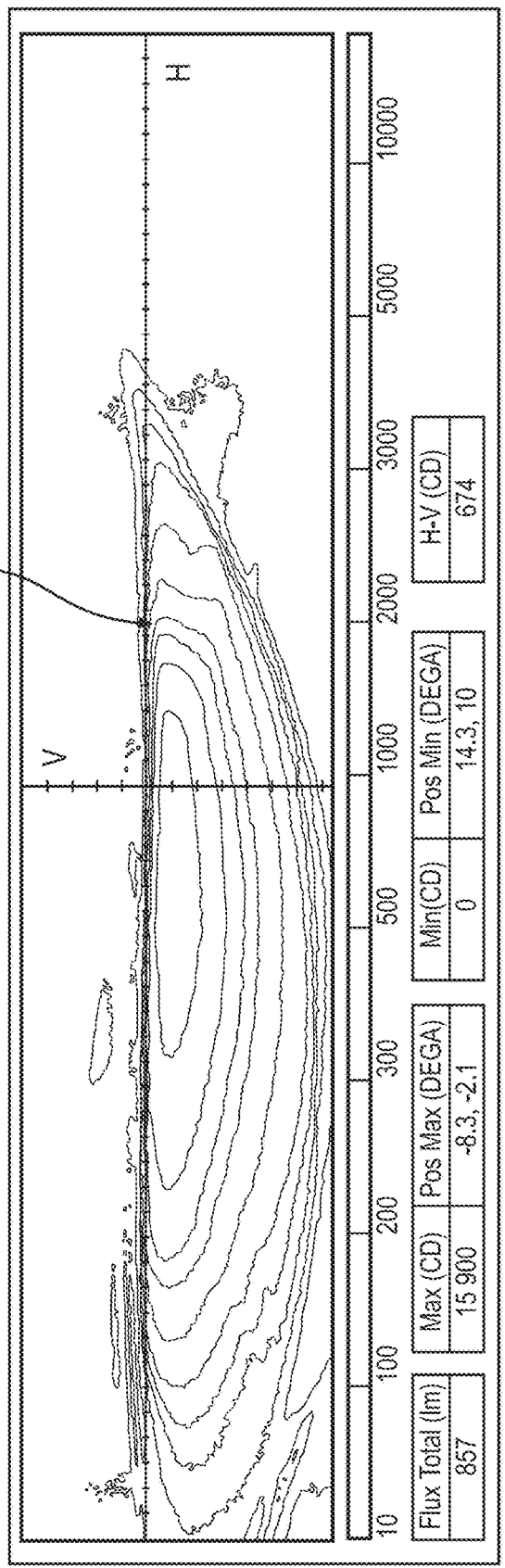
FIG. 5a shows exemplary luminous intensity distribution of a flat low beam module of the vehicle lamp assembly having a conventional projection lens with no diffusive material, according to an exemplary embodiment of the present invention.
Figure 5B:
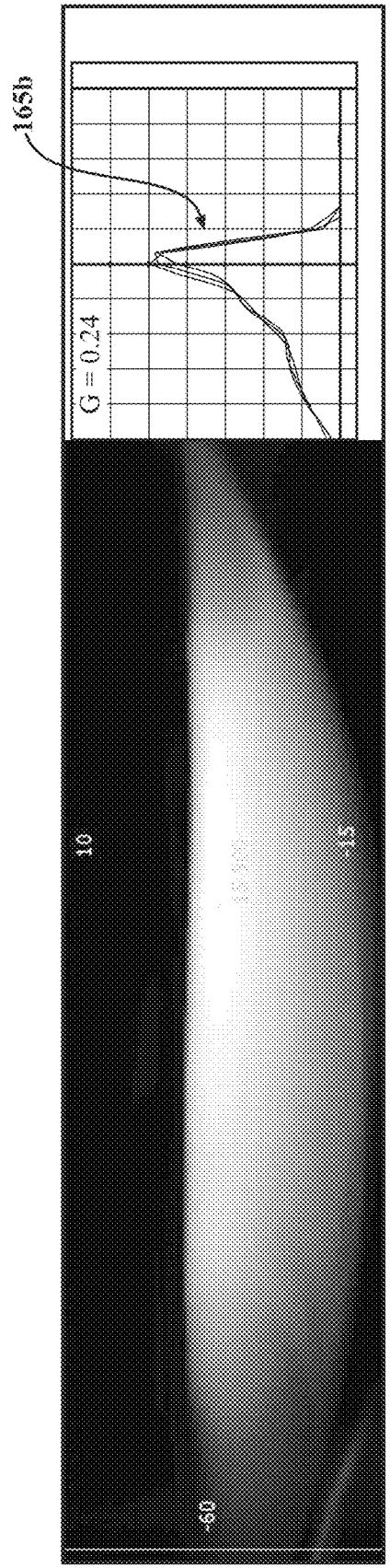
FIG. 5b shows the luminous distribution of FIG. 5a projected on a test surface (wall) and a curve indicating a variation of gradient along the beam pattern, according to an exemplary embodiment of the present invention.

FIG. 5a shows test results indicating exemplary luminous intensity distributions of a flat low beam module of the vehicle lamp with no diffusivity of the projection lens, according to an embodiment of the present invention. In the FIG. 5a, reference numeral 165a refers to the luminous intensity distribution. The maximum intensity is located at a position of −8.3 degrees along the horizontal axis and −2.1 degrees along the vertical axis. The maximum intensity illustrated is 15900 cd having a total lumen flux of 857. FIG. 5b shows the luminous distribution of FIG. 5a projected on a test surface (wall) and a curve 165b indicating a variation of gradient along the beam pattern.

Figure 6A:
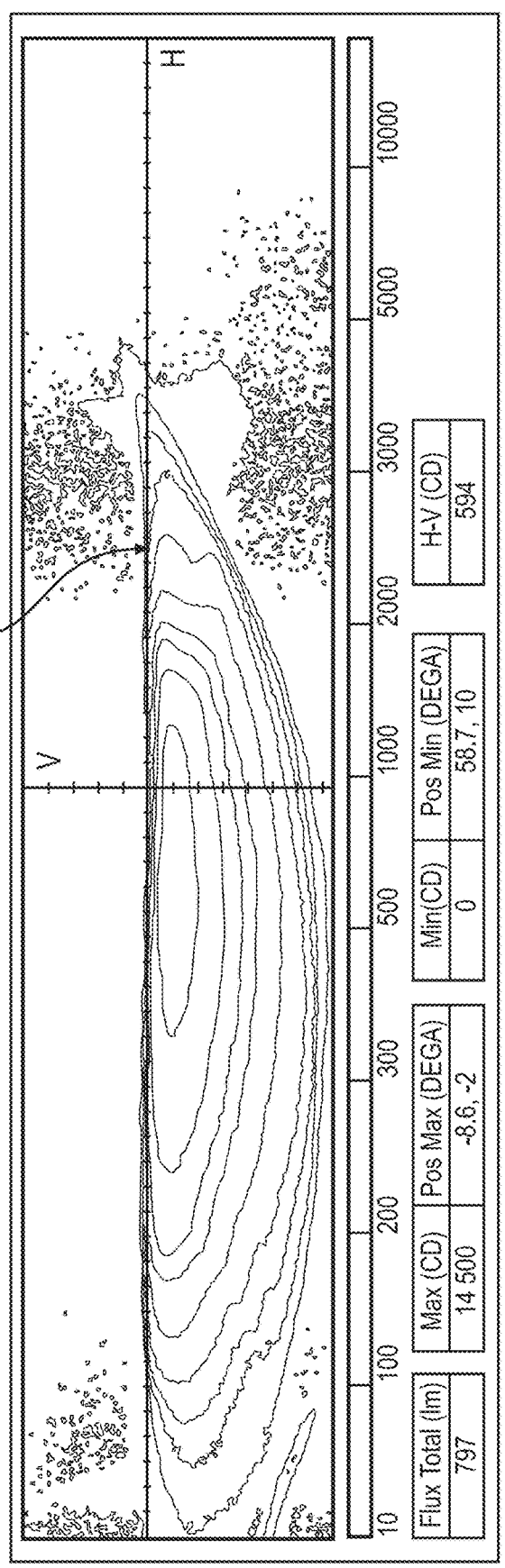
FIG. 6a shows exemplary luminous intensity distribution of a flat low beam module of the vehicle amp assembly having a diffusive projection lens, according to an exemplary embodiment of the present invention.
Figure 6B:
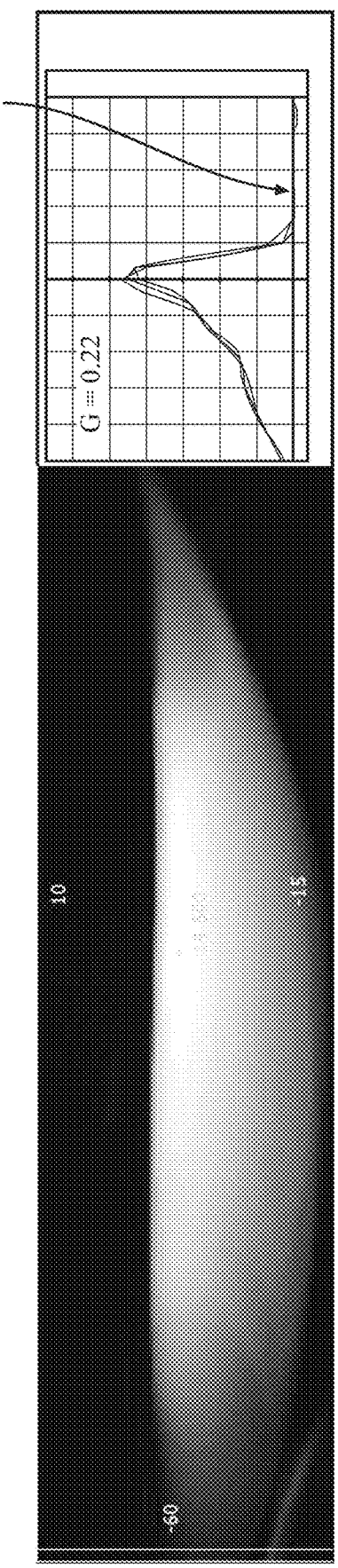
FIG. 6b shows the luminous distribution of FIG. 6a projected on a test surface (wall) and a curve indicating a variation of gradient along the beam pattern, according to an exemplary embodiment of the present invention.

FIG. 6a shows test results indicating exemplary luminous intensity distributions of a flat low beam module of the vehicle lamp with a diffusive projection lens, according to an embodiment of the present invention. In the FIG. 6a, reference numeral 170a refers to the luminous intensity distribution. The maximum intensity is located at a position of −8.6 degrees along the horizontal axis and −2 degrees along the vertical axis. The maximum intensity illustrated is 14500 cd having a total lumen flux of 797. FIG. 6b shows the luminous distribution of FIG. 6a projected on a test surface (wall) and a curve 170b indicating a variation of gradient along the beam pattern.

As can be understood from the FIG. 5a and FIG. 6a that the sharpness of the cut-off of the light beam pattern by adding the diffusive material. Further, from the curves of FIG. 5b and FIG. 6b, it is understood that the gradient has reduced to 0.22 from 0.24 when the projection lens is made of diffusive material. Because of presence of scattering bodies in the diffusive material, the gradient at the cut-off of the beam pattern has reduced to 0.22 from 0.24. Thus, the gradient of the beam is smoothened by using the diffusive projection lens, without effecting the low beam function. Further, it can be observed from the curves of the FIG. 5b and the FIG. 6b that the gradient is highest at the cut-off and it decreases gradually down in the beam pattern, i.e., in vertically downward direction. Thus, the diffusive projection lens aids in softening the gradient, and has minimum impact on hot spot performance. This allows the diffusive projection lens to be used as secondary function. Thus, the photometric simulation results shown in the FIG. 5a and FIG. 6a shows that the diffusive material improves the low beam performance, while allowing to perform the secondary function.

Figure 7A:
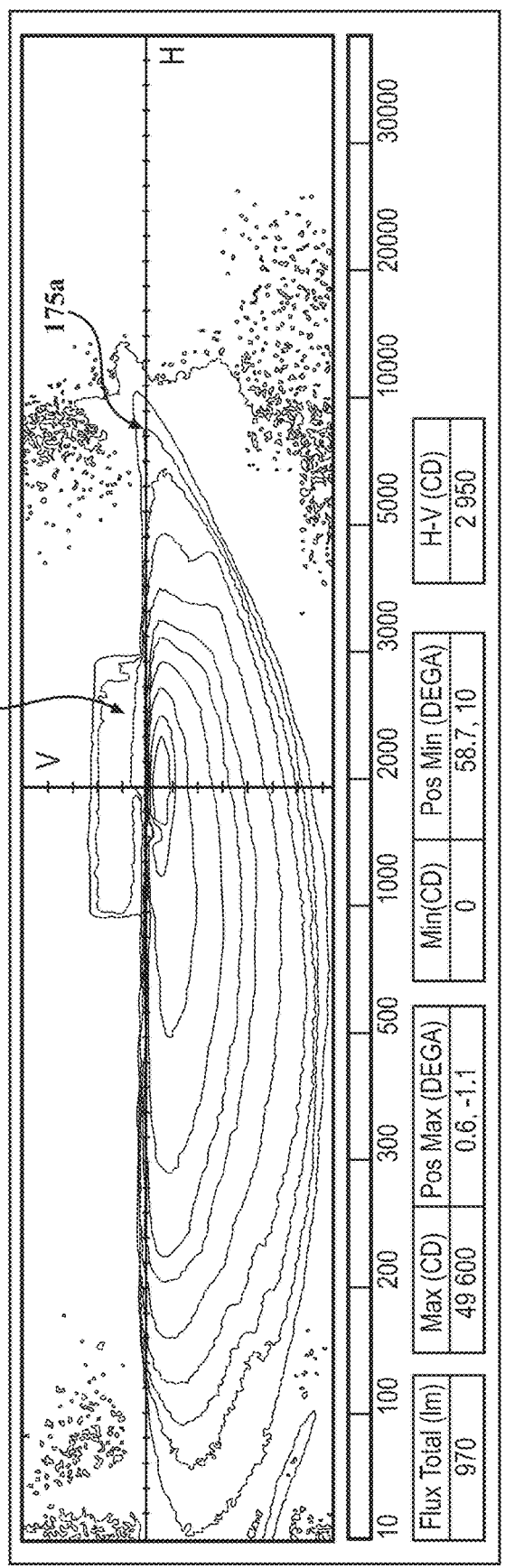
FIG. 7a shows exemplary luminous intensity distribution of a full low beam module (flat and kink) of the vehicle lamp assembly having a diffusive projection lens, according to an exemplary embodiment of the present invention.
Figure 7B:
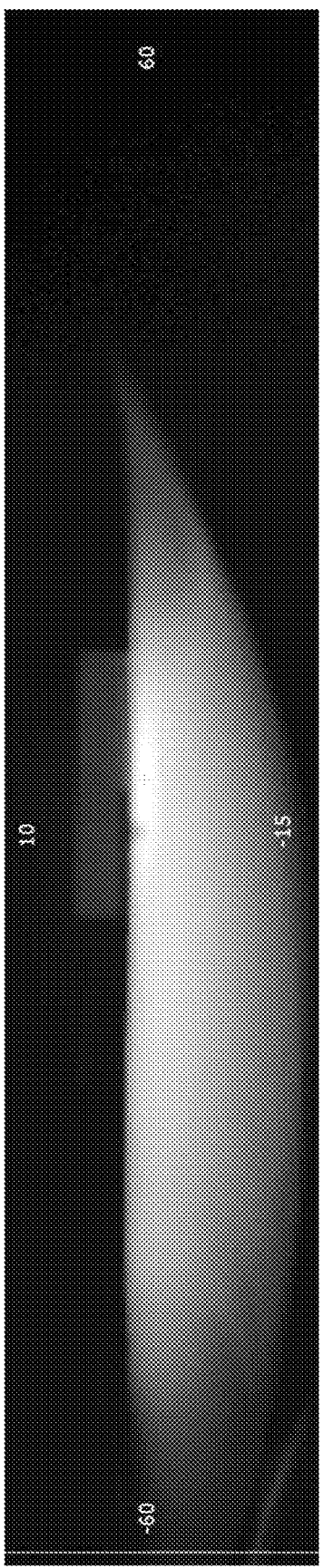
FIG. 7b shows the luminous distribution of FIG. 7a projected on a test surface (wall), according to an exemplary embodiment of the present invention.

In another exemplary embodiment of the present invention, the photometric simulation tests were performed to understand the performance of a full low beam module (kink and flat) with a diffusive projection lens. For example, the full low beam module may include a flat low beam module and a kink low beam module. FIG. 7a shows test results indicating exemplary luminous intensity distributions of the full low beam module of the vehicle lamp with a diffusive projection lens, according to an embodiment of the present invention. In the FIG. 7a, the reference numeral 175a refers to the luminous intensity distribution. The maximum intensity is located at a position of 0.6 degrees along the horizontal axis and −1.1 degrees along the vertical axis. The maximum intensity illustrated is 49600 cd having a total lumen flux of 970. FIG. 7b shows the luminous distribution of FIG. 7a projected on a test surface (wall), according to an embodiment of the present invention. As can be seen from the FIG. 7a, the total flux of the full low beam module with the diffusive projection lens is about 970 lumens. Further, as can be seen from the FIG. 7a, the diffusive projection lens 120 aids in adding or improving the sign light 175b.

Figure 8:
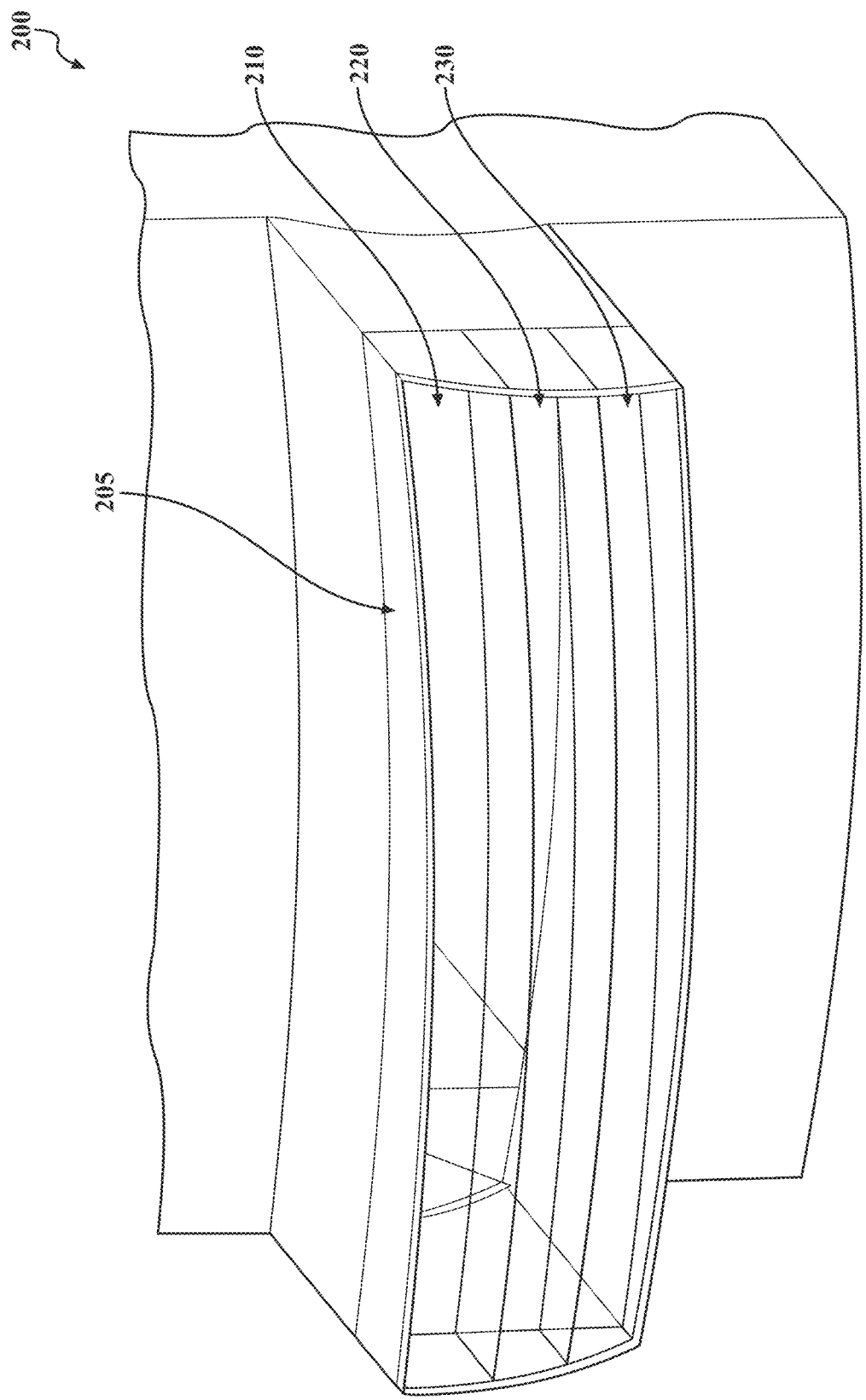
FIG. 8 shows an optical system in which the diffusive projection lens is produced by multi-shot injection process, according to another embodiment of the present invention.

FIG. 8 shows an optical system 200 in which the projection lens 205 is produced by multi-shot injection process, according to another embodiment of the present invention. According to this embodiment, the projection lens 205 may be formed from various opalescent or diffusive materials with different zones 210, 220, and 230 with different levels of diffusivity. A multi-shot injection process may be used to form the projection lens 205 with different zones 210, 220, and 230. The multi-shot injection process is very well known to a person skilled in the art and hence not discussed in detail. For the sake of brevity, the projection lens 205 shown in the FIG. 8 is formed with three different zones 210, 220 and 230 having different levels of the diffusivity from application of various grades of opalescent or diffusive materials.

Figure 9A:
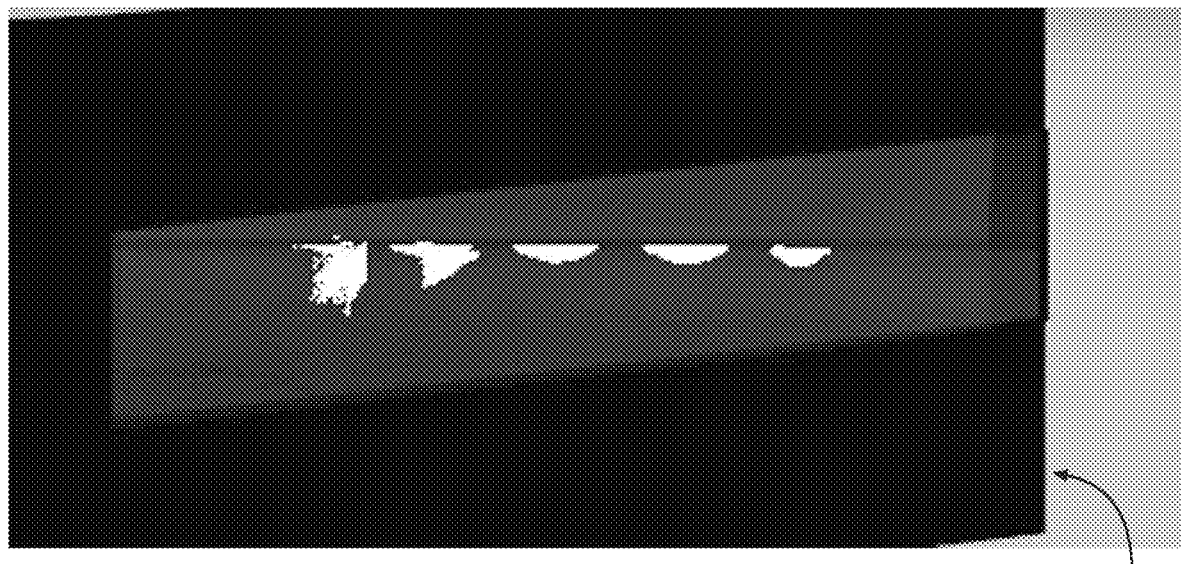
FIG. 9a shows an expected lit aspect of the lighting module having a conventional projection lens with no diffusive material, according to an exemplary embodiment of the present invention.
Figure 9B:
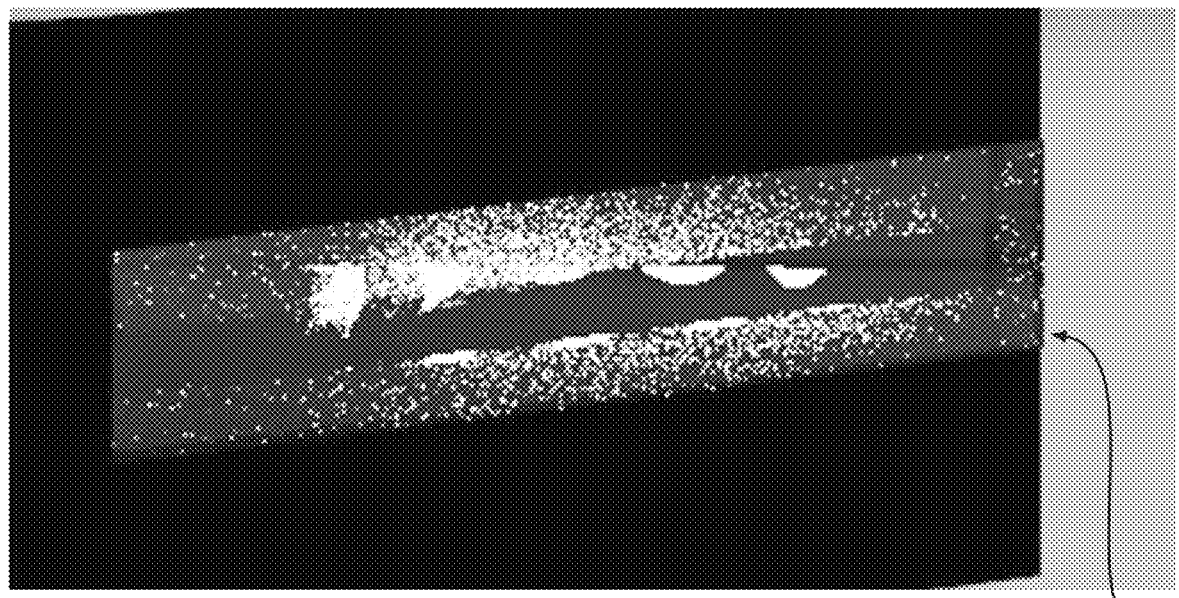
FIG. 9b shows an enhanced lit aspect of the lighting module having a multi-shot diffusive projection lens according to an exemplary embodiment of the present invention.

FIG. 9a and FIG. 9b shows a lit aspect of the lighting module having a multi-shot projection lens of the FIG. 8, made without and with diffusive material, respectively, according to an embodiment of the present invention. Reference numeral 240 refers to the lit of the light pattern when the multi-shot projection lens is made of exemplary lens material from various opalescent or diffusive grades or with no diffusive material. Further, reference numeral 245 in the FIG. 9b refers to lit of the light pattern when the multi-shot projection lens is made of exemplary mentioned diffusive material. It can be clearly seen from the FIG. 9b that the addition of the diffusive material has improved the overall lit-aspect and is made more homogeneous also.

Furthermore, the addition of diffusive material aids the dead region of the lens to light. In FIG. 9b, the illuminated portion is made of diffusive material and a portion outside the illuminating portion is made of non-diffusive material.

FIG. 10a and FIG. 10b shows test results indicating exemplary luminous intensity distributions of a flat low beam module of the vehicle lamp having multi-shot projection lens, without diffusivity and with diffusivity, respectively, according to an exemplary embodiment of the present invention. FIG. 10a shows luminous distribution of the flat low beam module having multi-shot lens made of normal lens material with no diffusive material. In the FIG. 10a, reference numeral 250 refers to the luminous intensity distribution. The maximum intensity is located at a position of −8.3 degrees along the horizontal axis and −2.1 degrees along the vertical axis. The maximum intensity illustrated is 15900 cd having a total lumen flux of 857. FIG. 10b shows luminous distribution of the flat low beam module with diffusive multi-shot projection lens. In the FIG. 10b, reference numeral 255 refers to the luminous intensity distribution. The maximum intensity is located at a position of −9.8 degrees along the horizontal axis and −1.9 degrees along the vertical axis. The maximum intensity illustrated is 14300 cd having a total lumen flux of 804. For instance, the multi-shot projection lens was diffusive with diffusive material PMMA 8N LD12. The gradient obtained with diffusive multi-shot projection lens is about 0.25, whereas the gradient obtained with multi-shot projection lens with no diffusion is about 0.28. Thus, with the use of the diffusive material, the gradient has improved, without degrading the performance of the low beam. For instance, the luminous efficiency calculated is 0.48 with no diffusion on the multi-shot projection lens, and the luminous efficiency is about 0.45 with diffusive multi-shot projection lens. Hence, the addition of the diffusive material aids in sharpening the gradient at the cut-off the beam pattern, without degrading the performance of the low beam.

Thus, the addition of diffusive material to the projection lens helps in adding sign light to the beam pattern, without using complex optical elements. Further, aids in sharpening the gradient at the cut-off the beam pattern. In addition, the diffusive material would help to provide a uniform lit aspect by scattering light guided in the material.

Although the present disclosure is provided with references to figures, all of the embodiments shown in figures are intended to explain the preferred embodiments of the present invention by ways of examples, instead of being intended to limit the present invention.

It should be apparent and would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least two (2) units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

LIST OF ELEMENT NUMBERS

Optical System 100
First optical element or shaping reflector 110
Second optical element or Diffusive projection lens 120
Housing 130
Cut-off profile of the shaping reflector 135
Diffusive or Opalescent Material 136
First light sources 140a
Secondary light sources 140b
First focal point 118
Second focal point 124
Light rays from first light source 145a
Light rays from the second light source 145b
Light guide 150
Luminous intensity distribution (Projection lens made of PMMA8N LD96) 160a
Luminous intensity distribution (Projection lens made of PMMA8N LD48) 160b
Luminous intensity distribution (Projection lens made of PMMA8N LD24) 160c
Luminous intensity distribution (Projection lens made of PMMA8N LD12) 160d
Cut-off of beam pattern 162
Luminous intensity distribution of a flat low beam module (Projection lens with NO diffusive material) 165a
Gradient curve 165b
Luminous intensity distribution of a flat low beam module (Projection lens with diffusive material) 170a
Gradient curve 170b
Luminous intensity distribution of a full low beam module (Projection lens with diffusive material) 175a
Sign light 175b
Optical system with multi-shot projection lens 200
Multi-shot diffusive projection lens 205
Different zones of multi-shot diffusive projection lens 210, 220, 230.
Lit aspect with no diffusion of projection lens 240
Lit aspect with diffusive projection lens 245
Luminous intensity distribution of a flat low beam module having multi-shot projection lens with no diffusive material 250
Luminous intensity distribution of a flat low beam module having multi-shot projection lens with no diffusive material 255

What is claimed is:

1. An optical system of an automotive vehicle, the optical system comprises:
a number of first optical elements that are configured to reflect light from a number of first light sources that are configured to perform a first lighting function, said first optical elements being shaping reflectors;
a second optical element configured to project a light beam transmitted from said first optical elements wherein at least a portion of the second optical element is made of a light diffusive material; and a number of secondary light sources, wherein the second optical element is configured to receive light emitted from said secondary light sources and configured to perform a second lighting function by scattering the light received from said secondary light sources.

2. The optical system of claim 1, wherein said secondary light sources are arranged on at least a number of sides of the second optical element and on a top of a second optical module.

3. The optical system of claim 1, wherein said first light sources are arranged at a vicinity of a focus of said first optical elements.

4. The optical system of claim 1, wherein the second optical element is a light diffusive lens.

5. The optical system of claim 1, wherein the second optical element is arranged at a downstream location of said first optical elements in a direction of propagation of associated light rays.

6. The optical system of claim 4, wherein the light diffusive lens has a thickness of about 2 mm to 7 mm.

7. The optical system of claim 1, wherein said secondary light sources are arranged on a top of a flange of a light diffusive lens.

8. The optical system of claim 1, wherein said first light sources and said secondary light sources are arranged on a same Printed Circuit Board (PCB).

9. The optical system of claim 1, wherein said first light sources and said secondary light sources are arranged on different PCBs or portions thereof.

10. The optical system of claim 1, wherein the first lighting function is one of: a low-beam function, a high-beam function, and a fog function.

11. The optical system of claim 1, wherein the second lighting function is one of: signature function, park function.

12. The optical system of claim 1, wherein said diffusive material includes at least one of Poly methyl methacrylate types: Evonik Acrylite, PMMA 8N LD12, PMMA 8N LD24, and PMMA 8N LD 48, and the like.

13. The optical system of claim 1, wherein the second optical element is adapted to produce the light beam pattern with a sharper cut off.

14. The optical system of claim 1, wherein top and bottom portions of the second optical element is made of a non-diffusive material and a middle portion of the second optical element is made of said diffusive material.

15. The optical system of claim 1, wherein an entire portion of the second optical element is made of said diffusive material.

16. The optical system of claim 1, wherein the second optical element is produced by a multi-shot injection process.

17. The optical system of claim 1, wherein the second optical element is adapted to increase the sharpness of the cut-off of the light beam pattern with an increased light diffusivity of said diffusive material, which is applied to produce the second optical element.

18. The optical system of claim 1, wherein the second optical element is an outer lens of the optical system.

19. A headlamp assembly of an automotive vehicle, the headlamp assembly comprises:

a number of low beam modules configured to generate a low beam distribution;

a number of high beam modules configured to generate a high beam distribution; and wherein at least one of the low beam modules and the high beam modules includes an optical system comprising:

a number of first optical elements that are configured to reflect light from a number of first light sources that are configured to perform a first lighting function, said first optical elements are shaping reflectors;

a second optical element arranged at a downstream location of said first optical elements that is configured to project a light beam transmitted from said first optical elements that are configured to perform the first lighting function, wherein a portion of the second optical element is made of a light diffusive material; and a number of secondary light sources, wherein the second optical element is configured to receive light from said secondary light sources and configured to perform a second lighting function by scattering the light from said secondary light sources.

* * * * *